United States Patent

[11] 3,567,159

| [72] | Inventor | Larry Klein<br>3856 Bronx Blvd., Bronx, N.Y. 10467 |
|---|---|---|
| [21] | Appl. No. | 772,147 |
| [22] | Filed | Oct. 31, 1968 |
| [45] | Patented | Mar. 2, 1971 |

[54] EMERGENCY AIRCRAFT LANDING DEVICE
3 Claims, 5 Drawing Figs.

| [52] | U.S. Cl. | 244/114 |
|---|---|---|
| [51] | Int. Cl. | B64f 1/00 |
| [50] | Field of Search | 244/114,<br>110, 63; 244/114, 110, 63, 100; 244/114, 110 |

[56] References Cited
UNITED STATES PATENTS

| 2,783,005 | 2/1957 | Kane | 244/110X |
|---|---|---|---|
| 3,003,717 | 10/1961 | Booker | 244/114X |
| 3,128,066 | 4/1964 | Bailey | 244/114 |
| 3,210,029 | 10/1965 | Brusch et al. | 244/114 |

FOREIGN PATENTS

| 41,452 | 4/1957 | Poland | 244/114 |
|---|---|---|---|

*Primary Examiner*—Milton Buchler
*Assistant Examiner*—Paul E. Sauberer
*Attorney*—Philip G. Hilbert

ABSTRACT: A landing device for emergency use by aircraft having damaged or inoperable landing gear wherein a vehicle or buggy is propelled along a given path for receiving the aircraft, together with a first cushion system for initially receiving the wing portions of the aircraft and a second cushion system for thereafter receiving the fuselage portions of the aircraft in a transfer operation from the first cushion system.

INVENTOR.
Larry Klein
BY
Chas. S. Hilber
ATTORNEY

EMERGENCY AIRCRAFT LANDING DEVICE

BACKGROUND OF THE INVENTION

A number of devices have been suggested as emergency aircraft landing means where the landing gear of the aircraft is either damaged or inoperable. However, such known devices do not adequately take into account the impact and weight of the aircraft as the same engages the device.

Accordingly, an object of this invention is to provide an improved emergency aircraft landing device wherein a vehicle movable in a path to receive the aircraft, is provided with dual support means including cushion elements; one support means being operable to receive the wing portions of the aircraft upon initial contact and thereafter transferring the full weight of the aircraft via its fuselage to the second support means.

Another object of this invention is to provide a device of the character described wherein the one support means is adjustable to complement the angle of attack of the wing structure of a given type of aircraft.

A further object of this invention is to provide in a device of the character described, improved cushion means adapted to materially reduce adverse impact effects as the aircraft engages the landing device.

Still another object of this invention is to provide in a device of the character described, improved means for transferring the weight of the aircraft from the first to the second support means in a progressive manner.

Other objects of this invention will in part be obvious and in part hereinafter pointed out.

DESCRIPTION OF THE PREFERRED EMBODIMENT

Figure 1:
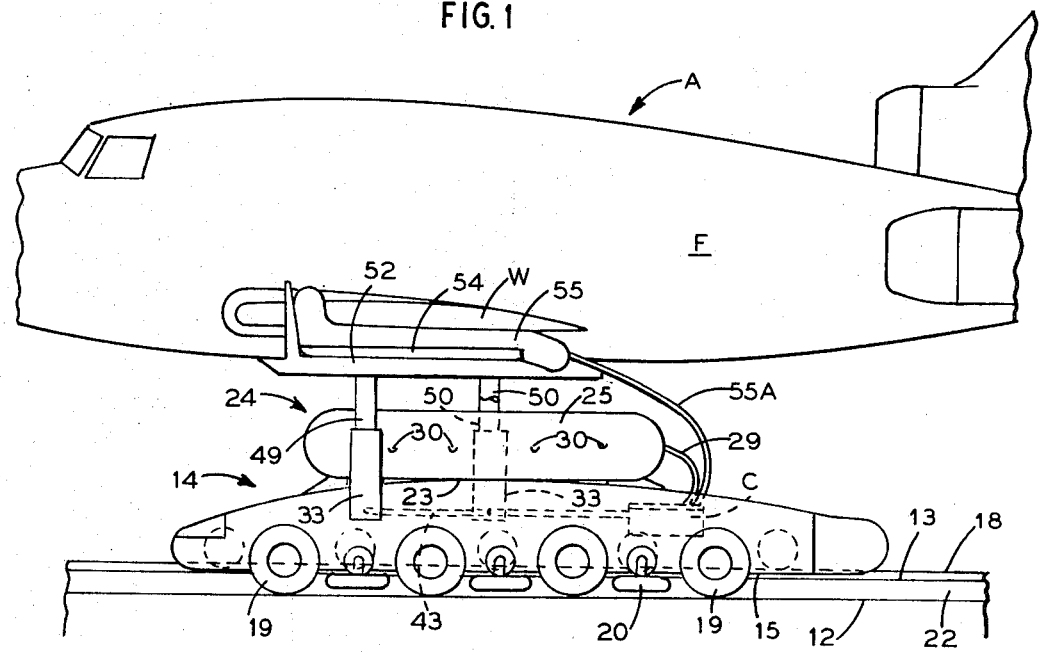
FIG. 1 is a side elevational view showing an emergency aircraft landing device embodying the invention.
Figure 2:
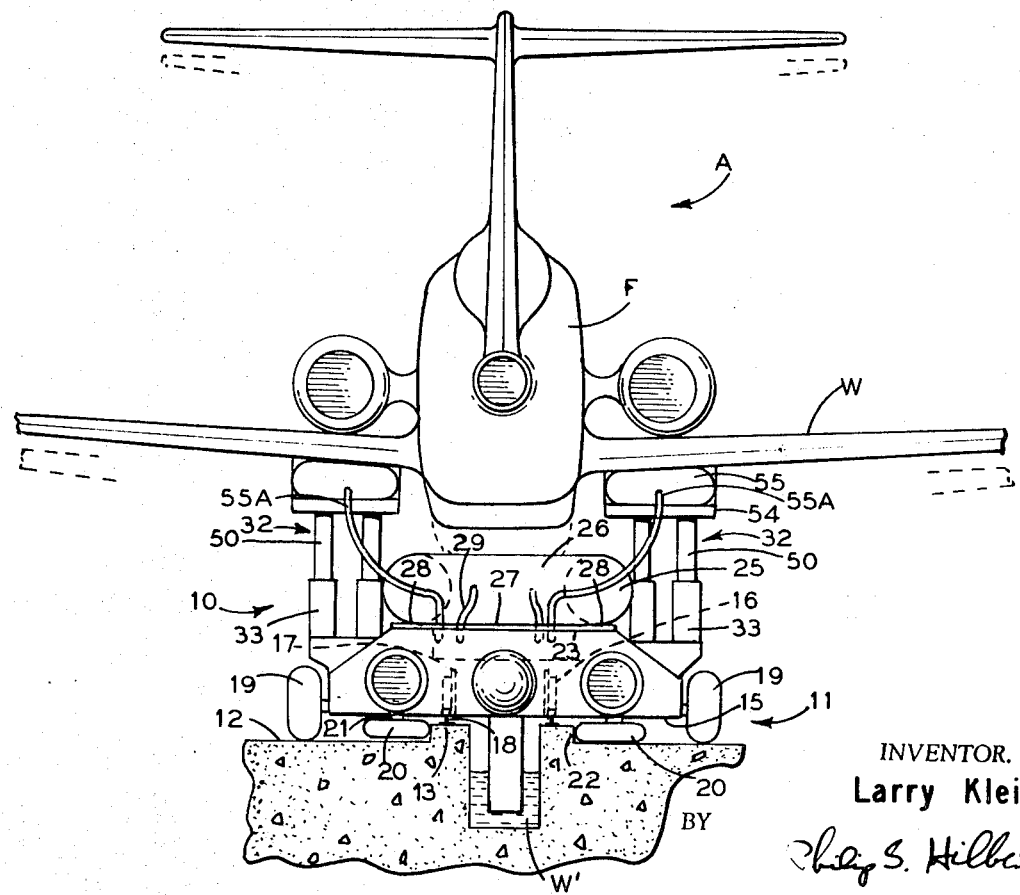
FIG. 2 is a partial front elevational view thereof.
Figure 3:
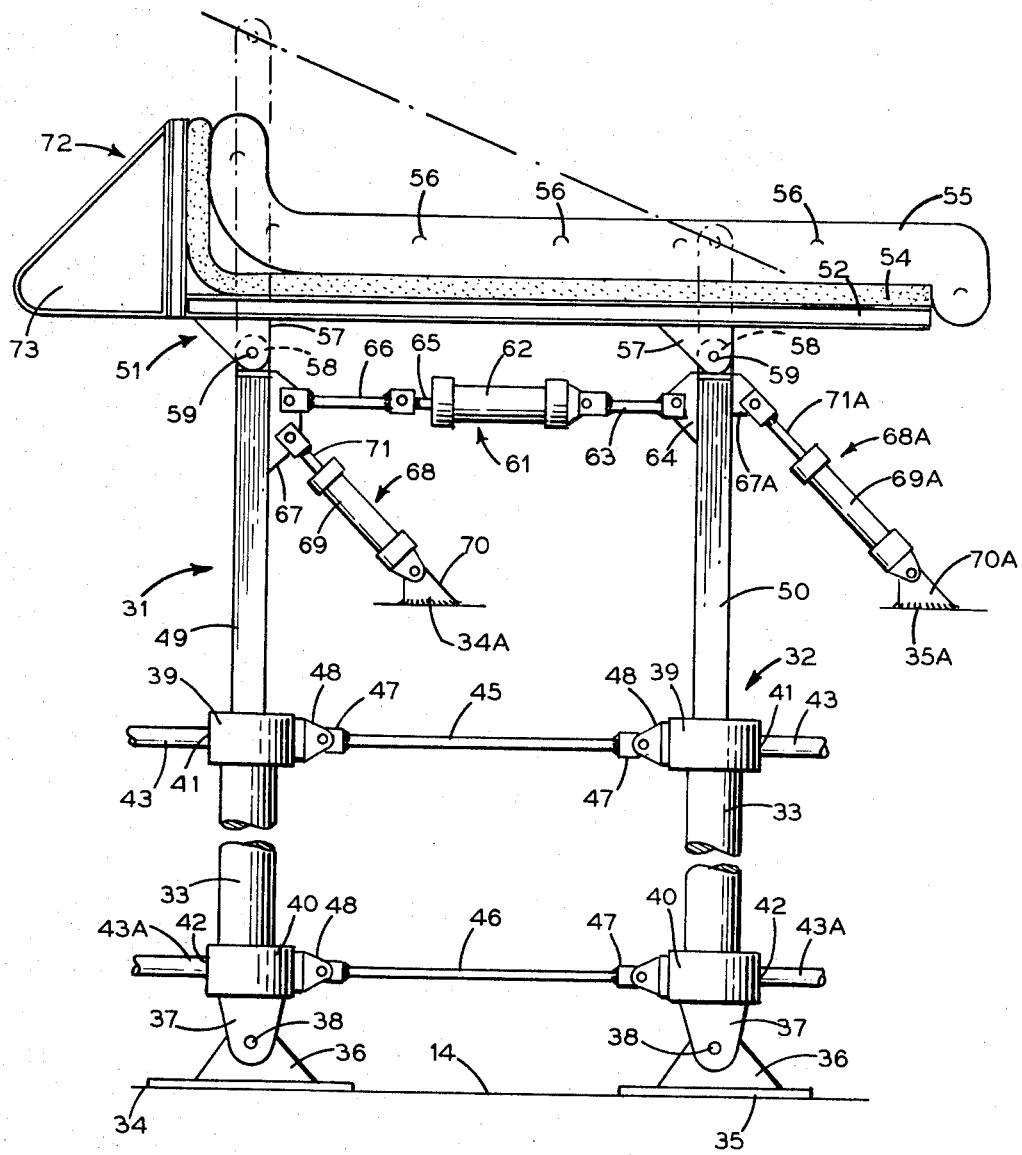
FIG. 3 is a side elevational view showing the wing cushion supporting system.
Figure 4:
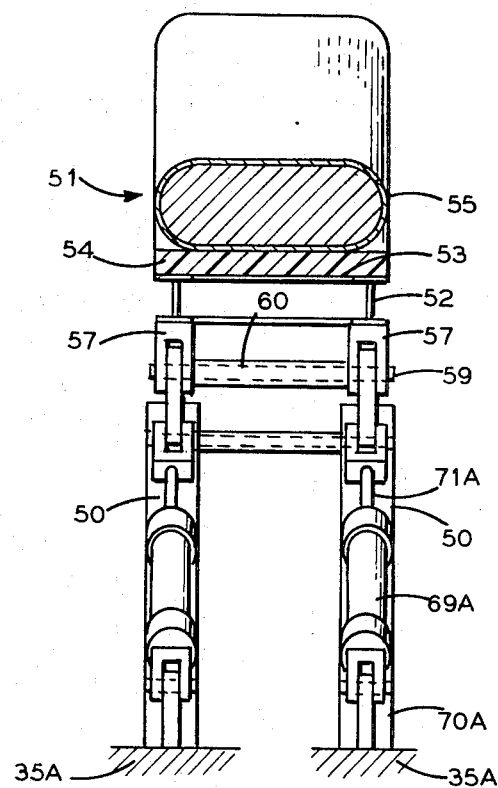
FIG. 4 is a rear elevational view showing upper portions thereof.
Figure 5:
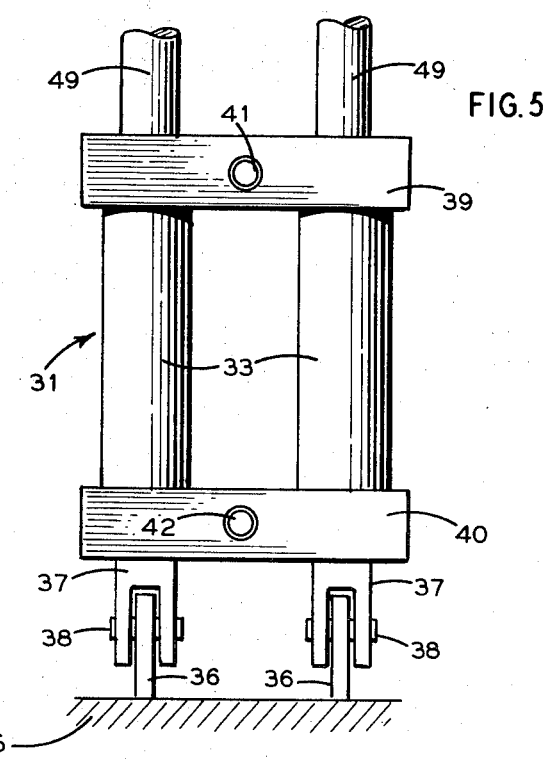
FIG. 5 is a front elevational view showing lower portions thereof.

Referring in detail to the drawings, 10 designates an emergency landing vehicle or buggy for an aircraft having damaged or inoperable landing gear, embodying the invention. The vehicle 10 is adapted to be propelled in a designated path 11 in a speed controlled manner to receive the aircraft A having the usual wing structure W and fuselage F.

The path 11 is defined by a continuous surface 12 of indefinite length having a pair of parallel, raised track receiving portions 13 located medially thereof and defining a longitudinally extending braking water channel W' therebetween. The buggy 10 comprises an elongated body 14 having a bottom wall 15 which is cutout as at 16 to mount flanged wheels 17 therein for engaging track members 18 fixed to the top surfaces of track receiving portions 13.

The body 14 is further provided with a plurality of pairs of tired wheels 19 for supporting the body on surface 12; together with stabilizing wheels 20 mounted on depending stub shafts 21 for engagement with friction surface portions 22 on the outer sides of track receiving portions 13. The body 14 has mounted thereon suitable propulsion means, not shown, such as jet engines or the like. Also, known control means for regulating the speed of device 10 in accordance with the speed of the aircraft to be landed, is located on body together with conventional parachute braking means, not shown.

The device 10 is adapted to receive and support the full weight of the aircraft A via its wing structure W and fuselage F. To this end, body 14 has mounted on a top wall 23 cushion means generally indicated at 24 for receiving the fuselage F of aircraft A. Cushion means 24 is of the inflatable type having parallel tubular portions 25 forming the sides thereof and interconnected by tubular end portions 26. A web 27 interconnects the bottom surface portions of the tubular portions 25, 26. Outwardly projecting marginal portions 28 of web 27 provides means for securing the cushion means 24 to top wall 23.

A compressor C on body 14 provides means for inflating cushion means 24 by way of a conduit 29. The tubular portions 25, 26 of cushion means 24 are provided for venting by small triangular valve elements cut into the walls thereof, for the purpose hereinafter appearing.

Separate means is provided for engaging and supporting the wing structure W of aircraft A immediately as the aircraft makes contact with device 10. To this end a pair of dual air cylinders 31 are mounted in an upstanding position on the forward portion of body 14 and the sides thereof. A second pair of dual air cylinders 32 are mounted in rear portions of body 14 and in respective longitudinal alignment with cylinders 31.

The individual air cylinders 33 of cylinder pairs 31, 32 are pivotally mounted at their lower ends to base portions 34, 35 of body 14, by brackets 36 fixed to base portions 34, 35 and received in forked depending portions 37 on cylinders 33 and connected by pivot pins 38. Collar members 39, 40 interconnect the top and bottom portions respectively, of dual cylinders 33. Collars 39, 40 have hollow portions in communication with the interior of cylinders 33, and are provided with an air inlet 41 on collars 39 and air outlets 42 on collars 40. Conduits 43 extend from inlets 41 to compressor C to supply air to the cylinders 33.

The longitudinally aligned cylinders 33 are held in determined relation to each other by threaded rods 45, 46 screwed into socket members 47 which are pivotally mounted in brackets 48 fixed to collars 39, 40. Piston rods 49, 50 are mounted in the forward and rear cylinders 33 respectively; and are connected at their upper ends to cushion platforms 51.

Platform 51 comprises parallel support members 52 with a top plate 53 interconnecting said members. A foam cushion 54 is secured to plate 53 and an inflatable air bag 55 is secured to cushion 54 and is supplied with air by conduits 55A. Bag 55 is provided with vents 56. Depending channel brackets 57 are secured to support members 52 to receive ear portions 58 upstanding from the upper ends of rods 49, 50. Pivot pins 59 connect ear portions 58 with brackets 57. Sleeves 60 on pins 59 maintain the laterally spaced rods 49, 50 in spaced relation.

The piston rods 49, 50 are further provided with shock absorber means. Thus, shock absorbers 61 interconnect each pair of longitudinally aligned piston rods 49, 50; the cylinders 62 thereof being connected by a link 63 to brackets 64 extending forwardly from upper portions of pistons 50. The pistons 65 of absorbers 61 are connected by links 66 to brackets 67 extending rearwardly from piston rods 49; the linkage connections of links 63, 66 being pivotal to allow for extended strokes for the forward piston rods 49 with limited strokes for the rear piston rods 50.

Further, piston rods 49 have shock absorbers 68 associated therewith; the cylinders 69 thereof being pivotally connected as at 70 to base portions 34A of body 14, while pistons 71 are pivotally connected to brackets 67. Similarly, shock absorbers 68 associated with piston rods 50 have their cylinders 69A pivotally connected to brackets 70A fixed to base portions 35A of body 14 while pistons 71A thereof are pivotally connected to brackets 67A on the upper portions of piston rods 50.

The platform 51 may include an upstanding head portion 72 at the forward end thereof with upstanding end portions of cushion 54 and bag 55 abutting the same. Triangular aerodynamic members 73 project forwardly of head portions 72 to reduce drag effects on the fast moving buggy 10.

In operating buggy 10, the same is brought up to speed related to that of aircraft A which is maneuvered to bring its wing structure W in alignment with platforms 51 which have been raised by piston rods 49, 50 to suitable positions related to the angle of attack of wing structure W of aircraft A;

through appropriate regulation of compressed air admitted by way of conduits 43 to cylinders 33, by suitable valve means, not shown.

The wings W of aircraft A will make contact with platforms 51 and will be received on air bags 55. At this time, suitable operation of the valve means, not shown, allows air to to escape from outlet conduits 43A, which permits the piston rods 49, 50, to move downwardly gradually. This will bring the fuselage F of aircraft A into engagement with the cushion means 24 to thereby transfer the full weight of the aircraft to such cushion means. The vent means 56 on bag 55 and vent means 30 on bag 24 allows for slow escape of air from said bags to thereby reduce impact effects when the wing and fuselage portions of aircraft A make contact with the respective air bags.

The shock absorbers 61, 68 and 68A further aid in coping with shock effects growing out of the initial contact of the wing structure W with platforms 51.

The rate of movement of buggy 10 as it carries the aircraft A may be reduced by suitable brake means including parachute means on body 14, not shown; and by lowering a braking plate from body 14, not shown, into the water channel W', in a manner known in the art.

It is understood that the movement of buggy 10 along path 11 is suitably controlled by an instrument landing system, known in the art, which coordinates the movement of plane A to that of buggy 10, so that the plane is properly positioned in respect to buggy 10 at the time of contact.

I claim:

1. An emergency aircraft landing device comprising a base, first support means comprising cushion means located medially of said base and extending longitudinally thereof for engaging and supporting the fuselage of said aircraft, second support means movably mounted on said base for movement to a position for initially engaging and supporting the wings of said aircraft, and thereafter to a position for transferring the weight of the wing supported aircraft to said first support means, said second support means comprising cylinder means mounted on side portions of said base and in upstanding relation thereto, plunger means extensibly mounted in said cylinder means, and cushion means mounted on the outer ends of said plunger means, said cylinder means comprising a first pair of longitudinally aligned cylinder members on one side of said base and a second pair of longitudinally aligned cylinder members on the other side of said base, said plunger means comprising plunger members in said cylinder members, cushion carrying means interconnecting the outer ends of each pair of plunger members, one set of laterally related plunger members having a stroke different from that of the other set of laterally related plunger members.

2. A landing device as in claim 1 and further including shock absorber means pivotally interconnecting each plunger member and said base.

3. A landing device as in claim 1 and further including means for pivotally connecting the lower ends of said cylinder members to said base for adjusting the positions of first and second mentioned cushion means relative to each other.